United States Patent
Sun et al.

(10) Patent No.: US 9,843,053 B2
(45) Date of Patent: Dec. 12, 2017

(54) FUEL CELL COATING

(75) Inventors: Ellen Y. Sun, South Windsor, CT (US);
Lei Chen, South Windsor, CT (US);
Jean Yamanis, South Glastonbury, CT (US); Neal Magdefrau, Tolland, CT (US); Dustin Frame, Glastonbury, CT (US)

(73) Assignee: Audi AG, Ingolstadt (DE)

( * ) Notice: Subject to any disclaimer, the term of this patent is extended or adjusted under 35 U.S.C. 154(b) by 1051 days.

(21) Appl. No.: 13/820,790

(22) PCT Filed: Sep. 9, 2010

(86) PCT No.: PCT/US2010/048190
§ 371 (c)(1),
(2), (4) Date: Apr. 1, 2013

(87) PCT Pub. No.: WO2012/033491
PCT Pub. Date: Mar. 15, 2012

(65) Prior Publication Data
US 2013/0216931 A1    Aug. 22, 2013

(51) Int. Cl.
| | |
|---|---|
| *H01M 8/02* | (2016.01) |
| *H01M 8/0228* | (2016.01) |
| *H01M 8/0206* | (2016.01) |
| *H01M 8/1231* | (2016.01) |

(52) U.S. Cl.
CPC ....... *H01M 8/0228* (2013.01); *H01M 8/0206* (2013.01); *H01M 8/1231* (2016.02)

(58) Field of Classification Search
CPC .................................................. H01M 8/0202
See application file for complete search history.

(56) References Cited

U.S. PATENT DOCUMENTS

| | | |
|---|---|---|
| 5,942,349 A | 8/1999 | Badwal et al. |
| 6,054,231 A | 4/2000 | Virkar et al. |
| 6,150,048 A | 11/2000 | Song et al. |
| 6,280,868 B1 | 8/2001 | Badwal et al. |
| 7,074,255 B2 | 7/2006 | Meacham |
| 7,144,649 B2 | 12/2006 | Yamanis et al. |
| 8,163,434 B2 * | 4/2012 | Kebbede ............. C23C 18/1216 427/115 |
| 2002/0127460 A1 | 9/2002 | Pham et al. |
| 2004/0200187 A1 | 10/2004 | Warrier et al. |
| 2005/0048357 A1 | 3/2005 | Badding et al. |
| 2006/0051661 A1 | 3/2006 | Meacham |
| 2006/0286433 A1 | 12/2006 | Rakowski et al. |
| 2008/0107948 A1 | 5/2008 | Yamanis |
| 2008/0280180 A1 * | 11/2008 | Correa ..................... B01J 8/003 429/479 |

(Continued)

FOREIGN PATENT DOCUMENTS

| | | | |
|---|---|---|---|
| EP | 2061111 | 5/2009 | |
| EP | 2104167 | * 9/2009 | ............. H01M 8/02 |

OTHER PUBLICATIONS

International Search Report and Written Opinion for PCT/US2010/048190 dated Jun. 24, 2011.

*Primary Examiner* — Scott J Chmielecki
(74) *Attorney, Agent, or Firm* — Seed IP Law Group LLP

(57) ABSTRACT

An example fuel cell stack component includes a metallic layer applied to the component and an oxide layer applied to the metallic layer. The oxide layer includes a chemical component that is not in the metallic layer.

20 Claims, 1 Drawing Sheet

(56) References Cited

U.S. PATENT DOCUMENTS

| | | | |
|---|---|---|---|
| 2009/0186249 A1* | 7/2009 | Narendar | H01M 8/0217 429/486 |
| 2009/0208785 A1* | 8/2009 | McElroy | H01M 8/04395 429/436 |
| 2009/0269623 A1* | 10/2009 | Kim | C23C 8/02 429/479 |
| 2009/0317705 A1* | 12/2009 | Alinger | H01M 8/021 429/160 |
| 2010/0015491 A1 | 1/2010 | Yamanis | |

* cited by examiner

FUEL CELL COATING

CROSS-REFERENCE TO RELATED APPLICATIONS

This application is the U.S. national phase of PCT/US2010/048190, filed Sep. 9, 2010.

BACKGROUND

This disclosure relates to solid oxide fuel cells. More particularly, this disclosure relates to a multi-layered coating used in solid oxide fuel cells.

Solid oxide fuel cells are known and used for generating electricity. A typical solid oxide fuel cell includes an electrolyte located between the anode and the cathode. A fuel cell stack may include multiple solid oxide fuel cells.

Interconnects are positioned between adjacent solid oxide fuel cells to connect the solid oxide fuel cells in series. The interconnects include channels that deliver fuel and oxygen to the fuel cell.

Some components of the fuel cell stack, such as the interconnects of some fuel cells, include a single-layer coating that suppresses the oxidation rate and prevents chromium containing species from evaporating and poisoning the cell. The coating is typically applied by slurry-based processes, such as a wet spray, a dip, or a screen printing. As known, the base alloys beneath the coating limit the firing temperature that can be used when applying the coating, which may result in pores within the coating. Chromium species, such as oxides or oxide hydroxides, can undesirably evaporate and transport through the pores in the coating. Accordingly, the coating is applied using a plasma spray technology, which can reduce the porosity in the coating, but this process is costly and limited by line-of-sight constraints. In parallel, chromium ions can diffuse through the solid state and coatings that reduce the conductivity of chromium ions through dense matter are needed.

SUMMARY

An example fuel cell stack component includes a metallic under-layer applied to the component, and an oxide layer applied to the metallic layer. The oxide layer includes at least one chemical element that is not in the metallic under-layer.

An example fuel cell arrangement includes an electrode including a solid oxide electrolyte between the anode and the cathode. The fuel cell arrangement includes an interconnect layer, and a first layer applied to the interconnect layer. A second layer is bonded to the first layer. The second layer includes at least one chemical element that is not in the first layer.

A method of coating a fuel cell stack component includes applying a metallic under-layer to the component. The method then applies an oxide layer to the metallic under-layer.

These and other features of the disclosed examples can be best understood from the following specification and drawings, the following of which is a brief description.

DETAILED DESCRIPTION

Figure 1:
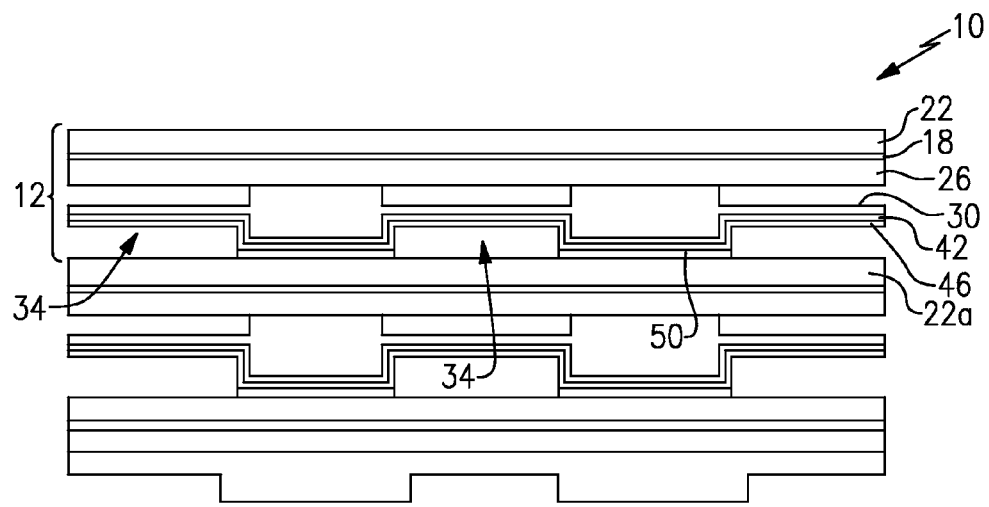
FIG. 1 shows an example fuel cell stack assembly.
Figure 2:
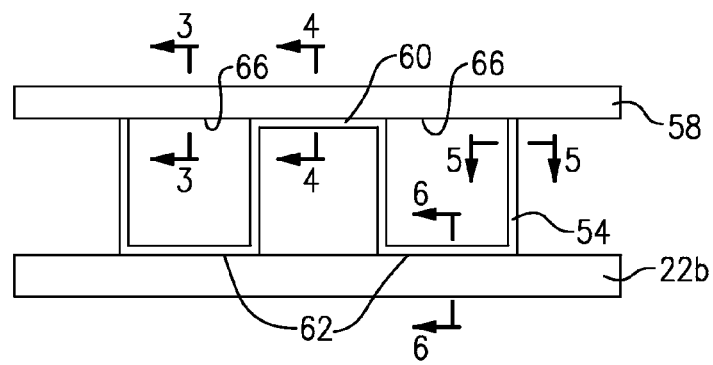
FIG. 2 shows a close-up view of a portion of a fuel cell unit having an interconnect that is different than the interconnect of the FIG. 1 fuel cell.
Figure 3:
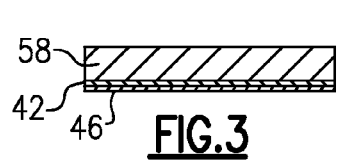
FIG. 3 shows a section view at line 3-3 of FIG. 2.
Figure 4:
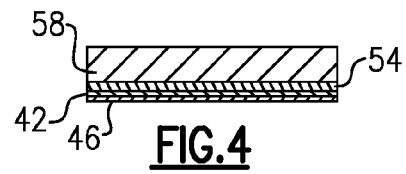
FIG. 4 shows a section view at line 4-4 of FIG. 2.
Figure 5:
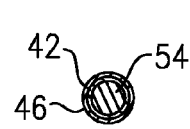
FIG. 5 shows a section view at line 5-5 of FIG. 2
Figure 6:
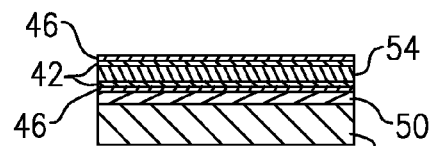
FIG. 6 shows a section view at line 6-6 of FIG. 2.

FIG. 1 schematically illustrates selected portions of an example fuel cell 10. In this example, the fuel cell 10 includes a stack of fuel cell units 12 that operate in a known manner to generate electricity. It should be understood that this disclosure is not limited to the arrangement of the example fuel cell 10. That is, the concepts disclosed herein may be applied to other types of fuel cells and other fuel cell arrangements.

In the illustrated example, the fuel cell units 12 each include an electrolyte layer 18 positioned between a cathode electrode 22 and an anode electrode 26. The electrolyte layer 18 may be any type of solid oxide electrolyte.

The example fuel cell units 12 also include an integral separator plate and interconnect 30 that establishes a plurality of channels 34. The channels 34 are used to deliver an oxidant to a cathode electrode 22a in another fuel cell unit.

The example fuel cell units 12 include a metallic under-layer 42 applied directly to the free surfaces of the side of the integral separator plate and interconnect 30 that faces the cathode electrode 22a and is exposed to air under fuel cell operating conditions. The integral separator plate and interconnect is often referred to as the bipolar plate. Similarly, what is called out as interconnect is often referred to as the current collector and these terms are often used interchangeably. An oxide layer 46 is applied to the metallic under-layer 42. A bonding layer 50 is used to hold the integral separator plate and interconnect 30 of one of the fuel cell units 12 relative to the cathode electrode 22a. The metallic under-layer 42, the oxide layer 46, and the bonding layer 50 are comprised of materials that are good electronic conductors at the solid oxide fuel cell operating conditions, for example, operating temperature greater than about 600° C.

The metallic under-layer 42 is a relatively thin layer. In one example, the metallic under-layer 42 is less than 20 micrometers thick. In another example, the metallic under-layer 42 is less than 10 micrometers. In yet another example, the metallic under-layer is less than 5 micrometers. The metallic under-layer 42 has been enlarged in FIG. 1 for illustration purposes.

Example materials suitable for the metallic under-layer 42 include copper, cobalt, nickel, iron, zinc, titanium, or the binary or ternary alloys of these materials or metal elements. The metallic under-layer 42 may be chosen to promote the capture of chromium by the formation of chromium intermetallic compounds. In another embodiment, the metallic under-layer 42 may be chosen to have a low chromium diffusivity so as to facilitate the capture of chromium and the formation of intermetallic compounds.

In one example, the metallic under-layer 42 is applied to the integral separator plate and interconnect 30 using an electroplating process. In other examples, electroless plating, vapor deposition, chemical vapor deposition or sputtering processes are used to apply the metallic under-layer 42 to the integral separator plate and interconnect 30. The metallic under-layer 42 may be subjected to heat treatments under high vacuum or inert atmospheres to drive interdiffusion of the elements that comprise under-layer 42 and integral separator plate and interconnect 30 prior to the application of the oxide layer 46.

The oxide layer 46 is secured directly to the metallic under-layer 42. The oxide layer 46 is applied by a slurry-based process in this example, such as a wet spraying by an air brush, a dipping, an ultrasonic spray process or a screen printing process. The oxide layer 46 includes one or more different chemical elements than the metallic layer 42. That is, the example oxide layer 46 is not an extension or a portion of the metallic under-layer 42 after layer 42 has inadvertently oxidized or has deliberately been oxidized.

The example oxide layer 46 is characterized by its low oxygen and chromium ion diffusivities. The example oxide layer 46 is also chemically stable with the metallic under-layer 42. Spinel-based or perovskite-based materials, such as $(Mn, Co)_3O_4$, $(Mn, Co, Cr)_3O_4$, $(La, Sr)MnO_3$, and $(La, Sr)(Co, Mn)O_3$, are used for the oxide-layer 46 in some examples.

The bonding layer 50 secures portions of the oxide layer 46 to the cathode electrode 22a. Spinel materials, such as $(Mn,Co)_3O_4$, $(Mn,Co, Fe)_3O_4$, and $(Mn,Cu)_3O_4$, are used to form the bonding layer. A mixture of metal oxides and metals, such as MnO and cobalt, or a mixture of metals, such as Mn and Co, are other examples of the materials used for the bonding layer.

Referring to FIGS. 2-6, another example fuel cell assembly includes an interconnect 54 attached to a separator plate 58. The interconnect 54, or current collector, is separate from the separator plate 58. For illustrative purposes, the interconnect 54 has a circular cross-section in this example. Interconnect 54 may be comprised of a single strand wire or wire screen configured in a variety of overall geometrical shapes, such corrugated channels in rectangular or dovetail configuration that impart compliance to the interconnect 54, and such structures are well described by the details of the under-layer topology shown in FIGS. 3-6.

The metallic under-layer 42 is secured to the surfaces of the interconnect 54 that do not directly support the separator plate 58. Thus, as can be appreciated from FIGS. 2-6, the metallic under-layer 42 substantially coats the interconnect 54 except in area 60, which represents a metallic bond between the interconnect 54 and the separator plate 58. The oxide layer 46 is directly secured to the metallic under-layer 42.

In areas 62, the bonding layer 50 secures the interconnect 54 relative to a cathode electrode 22b. The bonding layer 50 bonds to the oxide layer 46 in the areas 62 to hold the interconnect 54 and provide a path of low electronic resistance to electron flow.

In this example, the metallic under-layer 42 is also secured to the separator plate 58 in the areas that do not directly contact the interconnect 54 (e.g., areas 66). The oxide layer 46 is also secured to the metallic layer 42 in areas 66.

The metallic under-layer 42 in the example of FIGS. 2-6 is a cobalt-iron metallic alloy, and the oxide layer 46 is a spinel-based material, such as $(Mn, Co)3O4$. Other example materials suitable for the metallic under-layer 42 include copper, cobalt, nickel, iron, zinc, titanium, or the binary or ternary alloys of these materials or metal elements. Other example materials suitable for the oxide-layer 46 include spinel-based or perovskite-based materials, such as $(Mn, Co)_3O_4$, $(Mn, Co, Cr)_3O_4$, $(La, Sr)MnO_3$, and $(La, Sr)(Co, Mn)O_3$.

Features of the disclosed embodiments include a dual layer coating applied to portions of a fuel cell. In particular, the dual layer coating is applied to the metal surfaces that would be exposed to air in a stack, if these surfaces were not coated by the materials taught herein. These surfaces include the following: the free surfaces of the cathode current collector and the free surfaces of the separator plate, wherein free surfaces means that are not covered by another solid and would be exposed to the air gas stream in the absence of the coatings taught herein. The dual layer coating reduces the oxidation rate and contains chromium, i.e., eliminates evaporation of chromium compounds, such as oxides and oxide hydroxides, from chromia forming alloys, while still meeting the requirements for low Ohmic resistance to electron flow. Some solid oxide fuel cell alloys form spinels over the chromia even in the absence of coatings.

The dual-layer coating inhibits chromium evaporation and/or diffusion from the metal alloys of the current collector and separator plate through the oxide scale that forms by oxidation processes, and the applied coatings and to, consequently, substantially reduce or totally eliminate subsequent evaporation of chromium into the air gas stream. Reduction and/or elimination of chromium compound evaporation mitigates performance degradation of the solid oxide fuel cell, which is a well known phenomenon in the art.

The metallic under-layer 42 may be converted into a layer of multi-metal oxides having the crystalline structure of spinels, perovskites, or similar, the under the high operating temperatures of the solid oxide fuel cell. These multi-metal oxides may or may not contain elements that migrate into the crystalline structure of the multi-metal oxides by diffusion from oxidation products of the substrate metal, i.e., the integral separator plate and interconnect 42 or the separator plate 58 or interconnect 54. Similarly, these multi-metal oxides may or may not contain elements that migrate into the crystalline structure of the multi-metal oxides by diffusion from the oxide layer 46.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A fuel cell stack component comprising:
   an interconnect;
   a metallic layer applied to a surface of the interconnect, the metallic layer including at least one first chemical element;
   an oxide layer applied to the metallic layer, wherein the oxide layer includes a second chemical element, other than oxygen, that is distinct from the first chemical element; and
   a bonding layer applied to the oxide layer and binding the oxide layer to an electrode layer, the bonding layer comprising spinel materials, a mixture of metal and metal oxides, or a mixture of metals.

2. The fuel cell stack component of claim 1, wherein the interconnect is positioned on a cathode side of a solid oxide fuel cell.

3. The fuel cell stack component of claim 2, wherein the fuel cell stack component further comprises a separator plate.

4. The fuel cell stack component of claim 1, wherein the metallic layer comprises cobalt, copper, nickel, iron, titanium or a combination of these.

5. The fuel cell stack component of claim 1, wherein the metallic layer comprises a binary or ternary alloy including cobalt, copper, nickel, iron, titanium or a combination of these.

6. The fuel cell stack component of claim 1, wherein the metallic layer comprises a cobalt-iron alloy.

7. The fuel cell stack component of claim 1, wherein the metallic layer is less than 10 microns thick.

8. The fuel cell stack component of claim 1, wherein the metallic layer is applied to the fuel cell component using electroplating, electroless plating, vapor deposition, or sputtering or a combination of these.

9. The fuel cell stack component of claim 1, wherein the oxide layer comprises spinel-based or perovskite-based materials.

10. The fuel cell stack component of claim 1, wherein the oxide layer comprises a material selected from a group comprising $(Mn, Co)_3O_4$, $(Mn, Co, Cr)_3O_4$, $(La, Sr)MnO_3$, $(Mn, Co, Fe)_3O_4$, and $(La, Sr)(Co, Mn)O_3$.

11. The fuel cell stack component of claim 1, wherein the oxide layer is applied to the metallic layer using a spray process, painting, a dip process, electrophoretic deposition, a screen printing process, or a combination of these.

12. The fuel cell stack component of claim 1, wherein the oxide layer comprises metallic particles and an oxide matrix.

13. A fuel cell arrangement, comprising:
   an anode;
   a cathode;
   a solid oxide electrolyte between the anode and the cathode;
   an interconnect;
   a metallic layer bonded to the interconnect, the metallic layer including at least one first chemical element;
   an oxide layer bonded to the metallic layer, the oxide layer including a second chemical element, other than oxygen, that is distinct from the first chemical element; and
   a bonding layer applied to the oxide layer and binding the oxide layer to an electrode layer, the bonding layer comprising spinel materials, a mixture of metal and metal oxides, or a mixture of metals.

14. The fuel cell arrangement of claim 13, wherein the metallic layer comprises a cobalt-iron alloy, and the oxide layer comprises spinel-based or perovskite-based materials.

15. The fuel cell arrangement of claim 13, including a separator plate, the metallic layer bonded to the separator plate and the oxide layer bonded to the metallic layer.

16. A method, comprising;
   applying a metallic layer to an interconnect, the metallic layer including at least one first chemical element;
   applying an oxide layer to the metallic layer, the oxide layer including a second chemical element, other than oxygen, that is distinct from the first chemical element; and
   applying a bonding layer to the oxide layer and binding the oxide layer to an electrode layer, the bonding layer comprising spinel materials, a mixture of metal and metal oxides, or a mixture of metals.

17. The method of claim 16, wherein applying the metallic layer comprises a process selected from a group including electroplating, electroless plating, vapor deposition, sputtering, or a combination of these.

18. The method of claim 16, wherein applying the oxide layer comprises a process selected from a group including a wet spray process, painting, electrophoretic deposition, a dip process, a screen printing process, or a combination of these.

19. The fuel cell stack component of claim 1, wherein the bonding layer comprises $(Mn, Co)_3O_4$, $(Mn, Co, Fe)_3O_4$, $(Mn, Cu)_3O_4$, a mixture of MnO and cobalt or a mixture of Mn and Co.

20. The method of claim 16, further comprising:
   assembling a fuel cell comprising:
      an anode;
      a cathode;
      solid oxide electrolyte between the anode and the cathode;
      an interconnect produced according to the method of claim 18;
      a metallic layer bonded to the interconnect, the metallic layer including at least one first chemical element;
      an oxide layer bonded to the metallic layer, the oxide layer including a second chemical element, other than oxygen, that is distinct from the first chemical element; and
      a bonding layer applied to the oxide layer and binding the oxide layer to an electrode layer, the bonding layer comprising spinel materials, a mixture of metal and metal oxides, or a mixture of metals;
   wherein the bonding layer comprises $(Mn, Co)_3O_4$, $(Mn, Co, Fe)_3O_4$, $(Mn Cu)_3O_4$, a mixture of MnO and cobalt or a mixture of Mn and Co.

* * * * *